United States Patent [19]

Bast et al.

[11] Patent Number: 5,298,034
[45] Date of Patent: Mar. 29, 1994

[54] SOLVENT DYE PREPARATIONS

[75] Inventors: Klaus Bast, Bad Duerkheim; Ronald Sawa, Hockenheim; Wolfgang Keil, Birkenheide, all of Fed. Rep. of Germany

[73] Assignee: BASF Aktiengesellschaft, Ludwigshafen, Fed. Rep. of Germany

[21] Appl. No.: 983,365

[22] Filed: Nov. 30, 1992

[30] Foreign Application Priority Data

Dec. 5, 1991 [DE] Fed. Rep. of Germany ....... 4140085

[51] Int. Cl.$^5$ .......................... D06P 3/82; C09B 67/00
[52] U.S. Cl. ............................................. 8/552; 8/527
[58] Field of Search ................... 8/527, 552, 602, 609, 8/611

[56] References Cited

U.S. PATENT DOCUMENTS

| 3,966,669 | 6/1976 | Wolfe . |
| 4,319,881 | 3/1982 | Koci et al. . |
| 4,523,923 | 6/1985 | Buchel et al. . |
| 4,961,755 | 10/1990 | Bruttel et al. . |

FOREIGN PATENT DOCUMENTS

| 0118394 | 9/1984 | European Pat. Off. . |
| 0323407 | 7/1989 | European Pat. Off. . |
| 1446735 | 8/1976 | United Kingdom . |
| 2159972 | 12/1985 | United Kingdom . |

OTHER PUBLICATIONS

Colour Index, vol. 2, Second Edition, 1956, The Society of Dyers and Colorists, pp. 2815–2816, "Solvent Dyes."

Primary Examiner—Marianne M. Cintins
Assistant Examiner—John Peabody
Attorney, Agent, or Firm—Oblon, Spivak, McClelland, Maier & Neustadt

[57] ABSTRACT

Pulverulent dye preparations useful for preparing printing inks or finishes comprise one or more solvent dyes and an auxiliary selected from the group consisting of alkyl vinyl ethers, primary, secondary or tertiary alkylamines, polybutylene glycols and addition products of ethylene oxide with polybutylene glycols.

3 Claims, No Drawings

SOLVENT DYE PREPARATIONS

The present invention concerns novel pulverulent dye preparations comprising one or more solvent dyes and an auxiliary selected from the group consisting of $C_8$–$C_{30}$-alkyl vinyl ethers, primary, secondary or tertiary alkylamines having at least 10 carbon atoms in the molecule, polybutylene glycols having a molecular weight of from 1000 to 5000 and addition products of ethylene oxide with polybutylene glycols, said addition products having a molecular weight of from 1000 to 5000, and the use thereof for preparing printing inks or finishes.

As will be known, the dusting of solid, pulverulent dye preparations frequently causes problems with the making, handling and use of the preparations. For this reason it is customary and generally known to add to the preparations dustproofing agents, for example mineral oils, in order that thereby the problems mentioned may be avoided.

However, when pulverulent preparations of solvent dyes are dustproofed with conventional dustproofing agents they become difficult to use. For example, the dustproofing agents are insoluble or only partially soluble in the solvents intended for preparing a solution of the solvent dyes. Moreover, in printing inks the adhesion of the print to aluminum foil is strongly impaired.

A further problem that may arise with solvent dye preparations is standardizing the color strength of the preparation. This is because the dye as synthesized may in some cases be too strong. In these cases it is frequently very difficult to achieve a standardized color strength, and the use of "diluents" frequently leads to the abovementioned application defects.

It is an object of the present invention to provide novel pulverulent solvent dye preparations which contain an additive whereby the abovementioned difficulties with the use of solvent dyes are avoided.

We have found that this object is achieved by the dye preparations defined at the beginning.

The colorant component of the dye preparations of the invention is known per se, being described as solvent dyes in the Colour Index (see for example Colour Index, Second Edition 1956, Vol. 2, pages 2815 and 2816).

Solvent dyes are dyes which are readily soluble in organic solvents, for example alcohols, such as ethanol, propanol or butanol, esters, such as ethyl acetate or butyl acetate, ethers, such as 1-methoxypropan-2-ol, ketones, such as acetone or methyl ethyl ketone, aliphatic or aromatic hydrocarbons, oils, fats or waxes.

Chemically, solvent dyes are primarily azo dyes, but copper phthalocyanine or anthraquinone dyes are also envisioned.

Suitable azo dyes are in particular mono- or disazo dyes, in particular monoazo dyes, each in the form of their metal complexes. Suitable complexing metals are in particular copper, cobalt, chromium, nickel and iron, of which copper, cobalt and chromium are preferred. Particular preference is given to 1:1 and 1:2 chromium complexes.

In the complexes, the metallized groups are each preferably ortho to the azo group, for example in the form of o,o'-dihydroxy-, o-hydroxyl-o'-carboxy-, o-carboxy-o'-amino- or o-hydroxyl-o'-amino-azo groups.

Particularly suitable solvent dyes are for example C.I. Solvent Yellow 19, (13 900:1), C.I. Solvent Yellow 21 (18 690), C.I. Solvent Yellow 32 (48 045), C.I. Solvent Yellow 79, C.I. Solvent Yellow 81, C.I. Solvent Yellow 82 (18 690), C.I. Solvent Yellow 162, C.I. Solvent Orange 5 (18 745:1), C.I. Solvent Orange 6 (18 736:1), C.I. Solvent Orange 45 (11 700), C.I. Solvent Orange 54, C.I. Solvent Orange 56 (18 745:1), C.I. Solvent Orange 99, C.I. Solvent Brown 37, C.I. Solvent Brown 58, C.I. Solvent Red 35, C.I. Solvent Red 109, C.I. Solvent Red 118, C.I. Solvent Red 119, C.I. Solvent Red 122, C.I. Solvent Red 160, C.I. Solvent Red 225, C.I. Solvent Blue 70, C.I. Solvent Violet 2 (16 055/45 170), C.I. Solvent Black 25 (74 350), C.I. Solvent Black 27, C.I. Solvent Black 35 (12 195/12 197) or C.I. Solvent Black 47.

Suitable auxiliaries are for example $C_8$–$C_{30}$-alkyl vinyl ethers, such as octyl vinyl ether, isooctyl vinyl ether, 2-ethylhexyl vinyl ether, nonyl vinyl ether, isononyl vinyl ether, decyl vinyl ether, isodecyl vinyl ether, undecyl vinyl ether, dodecyl vinyl ether, tridecyl vinyl ether, isotridecyl vinyl ether, tetradecyl vinyl ether, pentadecyl vinyl ether, hexadecyl vinyl ether, heptadecyl vinyl ether, octadecyl vinyl ether, nonadecyl vinyl ether, eicosyl vinyl ether, heneicosyl vinyl ether, docosyl vinyl ether, tricosylvinyl ether, tetracosyl vinyl ether, pentacosyl vinyl ether, hexacosyl vinyl ether, heptacosyl vinyl ether, octacosyl vinyl ether, nonacosyl vinyl ether and triacosyl vinyl ether (the above designations isooctyl, isononyl, isodecyl and isotridecyl are trivial names derived from the oxo process alcohols—cf. Ullmanns Encyklopädie der technischen Chemie, 4th Edition, Volume 7, pages 215 to 217, and Volume 11, pages 435 and 436).

Suitable auxiliaries also include for example primary, secondary or tertiary alkylamines having at least 10 carbon atoms in the molecule. Of particular suitability are alkylamines which have from 10 to 30, in particular from 13 to 25, carbon atoms in the molecule.

Suitable primary amines are for example decylamine, isodecylamine, undecylamine, dodecylamine, tridecylamine, isotridecylamine, tetradecylamine, pentadecylamine, hexadecylamine heptadecylamine, octadecylamine, nonadecylamine and eicosylamine.

Suitable secondary amines are for example dipentylamine, N-ethyl-N-(2-ethylhexylamine), bis(2-ethylhexylamine), and diisotridecylamine.

Suitable tertiary amines are f or example tributylamine, N,N-dimethyl-N-(2-ethylhexyl)amine, N,N-dimethyl- N-$C_{10/18}$-alkylamine (mixture) and N,N,N',N',N''-pentamethyldiethylenetriamine.

Suitable auxiliaries also include for example polybutylene glycols, in particular poly-1,4-butylene glycols, having a molecular weight of from 1000 to 5000. Such products also go under the name of polytetrahydrofurans.

Suitable auxiliaries also include f or example addition products of ethylene oxide with polybutylene glycols, in particular poly-1,4-butylene glycols, the molecular weight of the addition products being from 1000 to 5000.

Of particular suitability are addition products in which the proportion of ethylene oxide is from 15 to 30% by weight, in particular from 20 to 25% by weight, each percentage being based on the weight of the addition product.

Particularly suitable auxiliaries are tris(2-ethylhexyl)amine, polybutylene glycols having a molecular weight of from 1000 to 5000 and octadecyl vinyl ether.

The pulverulent dye preparations of the invention have a solvent dye content of in general from 70 to 99% by weight, preferably from 90 to 99% by weight, each percentage being based on the weight of the preparation.

The proportion of auxiliary is customarily from 1 to 30% by weight, preferably from 1 to 10% by weight, each percentage being based on the weight of the preparation.

The novel dye preparations are preferably prepared by adding the auxiliary to the pulverulent solvent dye, for example in a mixing apparatus. It is particularly advantageous to spray the auxiliary onto the dye, for example through a nozzle by means of a peristeltic pump, at from 20° to 50° C. The choice of a temperature at the upper end of the range (at from 30° to 50° C.) ensures that those auxiliaries which at 20° C. are in the solid state will have passed into the liquid state at the time of use thereof.

The dye preparations of the invention are free of the disadvantages mentioned at the beginning; that is, they are completely soluble in the solvents customary for solvent dyes. Similarly, used in printing inks or finishes they show no reduction in the adhesion of the print to aluminum foil.

A further advantage of the novel dye preparations is that they make it easy to obtain a standardized color strength. By adding the auxiliary in the right amount it is possible to obtain the standardized color strength without incurring the abovementioned application disadvantages.

The dye preparations of the invention are advantageously suitable for preparing printing inks, for example flexographic or intaglio inks, or finishes, for example air-drying, acid-curing or amine-curing baking finishes or polyurethane finishes or peroxide-curing polyester finishes, or else wood stains, ballpoint pen pastes, writing inks or electrostatic toners.

The Examples which follow will further illustrate the invention.

EXAMPLE 1

A mixer was charged with 1 kg of C. I. Solvent Yellow 79. 30 g of polybutylene glycol having a molecular weight of 1250 were added at 20° C. with stirring through a nozzle using a hose pump. On completion of the addition, which took 10 minutes, stirring was continued at 20° C. for a further 30 minutes. The resulting dye preparation was immediately ready for use.

EXAMPLE 2

A mixer was charged with 1 kg of C. I. Solvent Yellow 82 (18 690). 100 g of polybutylene glycol having a molecular weight of 1200 were added at 20° C. with stirring through a nozzle using a hose pump. On completion of the addition, which took 10 minutes, stirring was contained at 20° C. for a further 30 minutes. The resulting dye preparation was immediately ready for use.

EXAMPLE 3

A mixer was charged with 100 g of C.I. Solvent Orange 56 (18 745:1). 20 g of octadecyl vinyl ether were added at 50° C. with stirring through a nozzle using a hose pump. On completion of the addition, which took 10 minutes, stirring was continued at 50° C. for a further 30 minutes. The resulting dye preparation was immediately ready for use.

EXAMPLE 4

A mixer was charged with 1 kg of C. I. Solvent Blue 70. 100 g of octadecyl vinyl ether were added at 50° C. with stirring through a nozzle using a hose pump. On completion of the addition, which took 30 minutes, stirring was continued at 50° C. for a further 30 minutes. The resulting dye preparation was immediately ready for use.

EXAMPLE 5

A mixer was charged with 100 g of C.I. Solvent Black 35 (12 195/12 197). 10 g of tris(2-ethylhexyl)amine were added at 20° C. with stirring through a nozzle using a hose pump. On completion of the addition, which took 20 minutes, stirring was continued at 20° C. for a further 30 minutes. The resulting dye preparation was immediately ready for use.

EXAMPLE 6 (USE)

0.5 g of the dye preparation of Example 2 was roll milled together with 19.5 g of a commercial lacquer based on low-substituted nitrocellulose (16% by weight in ethyl acetate/ethanol) . The dye preparation dissolved very readily in the lacquer. The resulting printing ink was applied to aluminum foil with a 24 μm doctor blade and dried.

After drying, the print is seal-fast and adheres firmly to the aluminum foil.

EXAMPLE 7 (USE)

0.5 g of the dye preparation of Example 4 was roll milled together with 19.5 g of a commercial lacquer based on a vinyl chloride/vinyl acetate copolymer (11.5% by weight in ethyl acetate/methyl ethyl ketone). The dye preparation dissolved very readily in the lacquer. The resulting printing ink was applied to aluminum foil with a 24 μm doctor blade and dried.

After drying, the print adheres firmly to the aluminum foil.

We claim:

1. Pulverulent dye preparations comprising from 70 to 99% by weight of one or more solvent dyes and from 1 to 30% of an auxiliary selected from the group consisting of polybutylene glycols having a molecular weight of from 1000 to 5000 and addition products of ethylene oxide with polybutylene glycols, said addition products having a molecular weight of from 1000 to 5000, based on the weight of the preparation.

2. Pulverulent dye preparations as claimed in claim 1, containing as solvent dye one or more dyes of the class of the metal complexes of mono- or disazo dyes.

3. A method of preparing printing inks or finishes comprising mixing the pulverulent dye preparations of claim 1 with a suitable carrier.

* * * * *